US008103796B2

(12) United States Patent
Zimmet et al.

(10) Patent No.: US 8,103,796 B2
(45) Date of Patent: *Jan. 24, 2012

(54) MAINTAINING COMMUNICATION CONTINUITY

(75) Inventors: Carol Sue Zimmet, Boxborough, MA (US); Patrick Joseph O'Sullivan, BallsBridge (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/949,698

(22) Filed: Nov. 18, 2010

(65) Prior Publication Data

US 2011/0119524 A1 May 19, 2011

Related U.S. Application Data

(62) Division of application No. 11/967,946, filed on Dec. 31, 2007, now Pat. No. 7,886,014.

(51) Int. Cl.
*G06F 15/16* (2006.01)
(52) U.S. Cl. .................. 709/246; 709/206
(58) Field of Classification Search .......... 709/206, 709/246
See application file for complete search history.

(56) References Cited

U.S. PATENT DOCUMENTS

2008/0208984 A1* 8/2008 Rosenberg et al. ........... 709/206
2009/0137229 A1* 5/2009 Ye et al. ..................... 455/412.1

FOREIGN PATENT DOCUMENTS

CN 101009665 A 8/2007
* cited by examiner

*Primary Examiner* — Larry Donaghue
(74) *Attorney, Agent, or Firm* — Steven L. Nichols; Van Cott, Bagley, Cornwall & McCarthy P.C.

(57) ABSTRACT

A computer program product includes a computer usable memory, storage medium or physical medium having computer usable program code embodied therewith, the computer usable program code including:
computer usable program code configured to receive a message from a client electronic device in a first format configured to be communicated over a first communication channel;
computer usable program code configured to modify the message in the first format to form a message in a second format configured to be communicated over a second communication channel, the message in the second format based upon at least in part, the message in the first format; and
computer usable program code configured to transmit the message in the second format over the second communication channel.

21 Claims, 5 Drawing Sheets

MAINTAINING COMMUNICATION CONTINUITY

CROSS-REFERENCE RELATED APPLICATION

This application is a divisional and claims the priority under 35 U.S.C. §120 of previous U.S. patent application Ser. No. 11/967,946, now allowed, which application is incorporated herein by reference in its entirety.

BACKGROUND

This disclosure relates to messaging systems, and more particularly to maintaining communication continuity in messaging systems.

Communications systems, such as email and instant messaging, are considered to be mission critical by many corporations. That is, the use and availability of such communications systems are deemed to be essential for the effective operation of the company. Given the importance of these mission critical systems, companies often devote significant resources to developing and implementing various plans, protections, and measures to ensure that the important communications systems remain up and running, with the goal being 100% (i.e., continuous) up time and availability of services.

For example, often redundant servers may be used for a given communication system, such as email. In the event of a failure in one server, the redundant server may be employed to ensure and maintain the availability of the email system. Additionally, the redundant servers may be geographically distributed. In the event of a power failure, such as a city-wide power failure, while one server may be affected, the geographically distributed servers may continue to operate. The unaffected email servers may assume the responsibility of maintaining email communications for the company until the power failure is overcome.

Further, separate servers may be used for different communications systems. An email system may be deployed on a first server, while an instant messaging system may be deployed on a second server. In the event of a failure of one server, such as an email server, the instant messaging server may continue to operate. The hope is that, even though email communications may be interrupted as a result of the failure of the email system, at least instant messaging communications may remain available.

While the various protections and measures implemented to ensure continuous operation of mission critical systems may be largely effective, failures and losses still occur. Additionally, even though alternative communication systems may be available (e.g., instant messaging may be used in the event of an email failure), the alternative systems may be less desirable. The ability to utilize alternative communications systems in the event of a failure in one communication system requires the availability of the alternative system, and an awareness by each party to the communication that one of the communication systems has failed.

BRIEF SUMMARY

In a first implementation, a method includes receiving, on a client electronic device, a message in a first format configured to be communicated over a first communication channel. The message in the first format is modified, on the client electronic device, to form a message in a second format configured to be communicated over a second communication channel. The message in the second format is based upon, at least in part, the message in the first format. The message in the second format is transmitted, from the client electronic device, over the second communication channel.

According to another implementation, a computer program product resides on a computer readable medium having a plurality of instructions stored on it. When executed by a processor, the instructions cause the processor to perform operations including receiving, on a client electronic device, a message in a first format configured to be communicated over a first communication channel. The message in the first format is modified, on the client electronic device, to form a message in a second format configured to be communicated over a second communication channel. The message in the second format is based upon, at least in part, the message in the first format. The message in the second format is transmitted, from the client electronic device, over the second communication channel.

DETAILED DESCRIPTION

Figure 1:
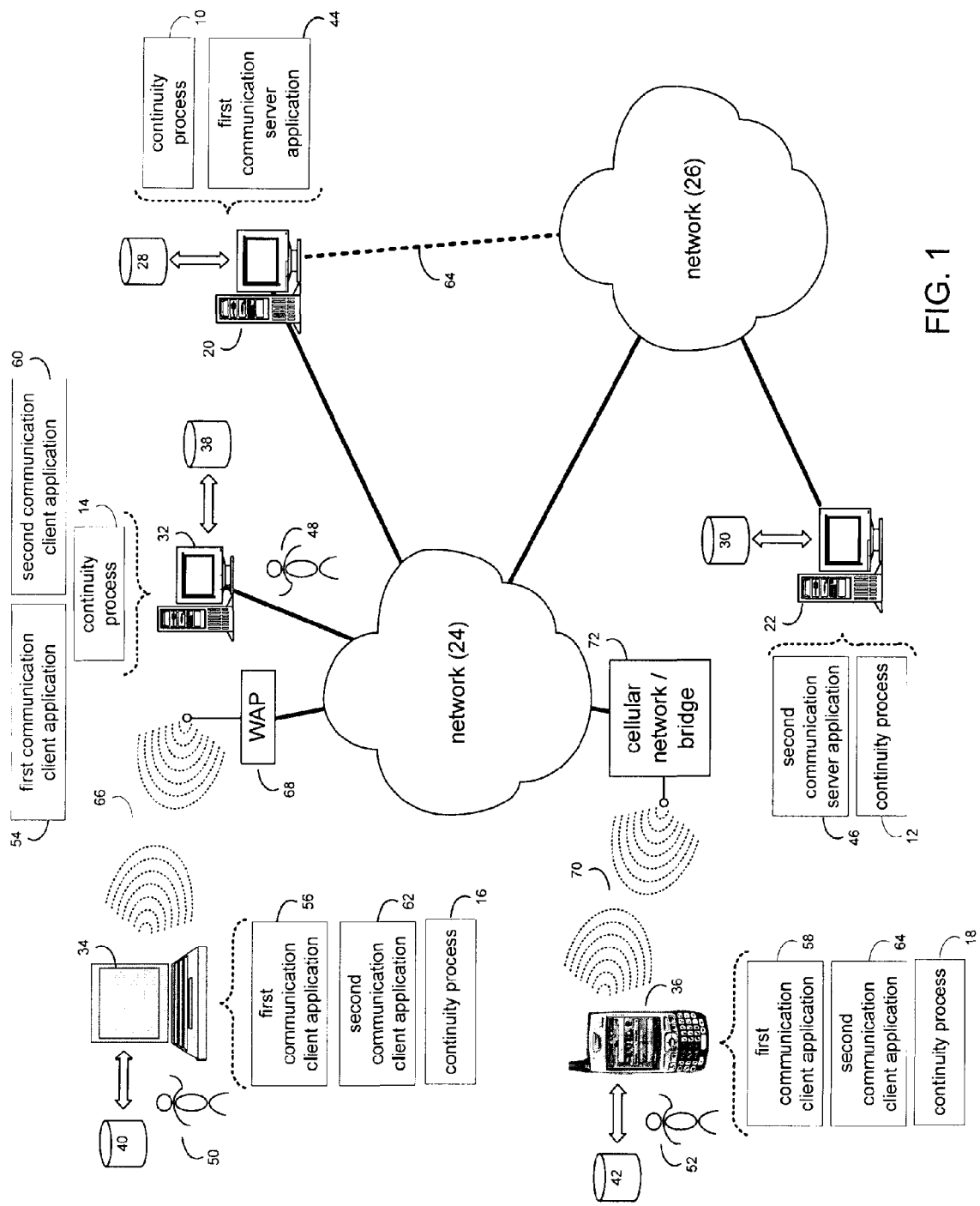
FIG. 1 is a diagrammatic view of a continuity process, a first communication application, and second communication application coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown a continuity process. As will be discussed in greater detail below, the continuity process may receive, on a client electronic device, a message in a first format configured to be communicated over a first communication channel. The continuity process may further modify, on the client electronic device, the message in the first format to form a message in a second format configured to be communicated over a second communication channel. The message in the second format may be based upon, at least in part, the message in the first format. The message in the second format may be transmitted, from the client electronic device, over the second communication channel.

The continuity process may be a server-side process (e.g., server-side continuity process 10, or server-side continuity process 12), a client-side process (e.g., client-side continuity process 14, client-side continuity process 16, or client-side continuity process 18), or a hybrid server-side/client-side process (e.g., the combination of one or more of server-side continuity process 10, 12 and one or more of client-side continuity process 14, 16, 18).

Server-side continuity processes 10, 12 may reside on and may be executed by server computers 20, 22 (respectively), which may be connected to networks 24, 26 (e.g., the Internet, a local area network, or a wide area network). Examples of server computers 20, 22 may include, but are not limited to: a personal computer, a server computer, a series of server computers, a mini computer, and a mainframe computer. Server computers 20, 22 may each be a web server (or a series of servers) running a network operating system, examples of which may include but are not limited to: Microsoft® Windows® XP Server; Novell® NetWare®; or Redhat® Linux®, for example (Microsoft and Windows are registered trademarks of Microsoft Corporation in the United States, other countries or both; Novell and NetWare are registered trademarks of Novell Corporation in the United States, other countries or both; Redhat is a registered trademark of RedHat Corporation in the United States, other countries or both; and Linux is a registered trademark of Linus Torvales in the United States, other countries or both), for example.

The instruction sets and subroutines of server-side continuity processes 10, 12, which may be stored on storage devices 28, 30 (respectively) coupled to server computers 20, 22, may be executed by one or more processors (not shown) and one or more memory architectures (not shown) incorporated into server computers 20, 22. Storage devices 28, 30 may include but are not limited to: a hard disk drive; a tape drive; an optical drive; a RAID array; a random access memory (RAM); and a read-only memory (ROM).

Server computers 20, 22 may execute a web server application, examples of which may include but are not limited to: Microsoft IIS, Novell Webserver, or Apache Webserver, that allows for HTTP (i.e., HyperText Transfer Protocol) access to server computers 20, 22 via network 24 and/or 26. Network 24 may be connected to network 26. Further networks 24, 26 may be connected to one or more secondary networks (not shown), examples of which may include but are not limited to: a local area network; a wide area network; or an intranet, for example.

Client-side continuity processes 14, 16, 18 may reside on and may be executed by client electronic devices 32, 34, 36 (respectively), examples of which may include, but are not limited to, personal computer 32, notebook computer 34, personal digital assistant 36, a data-enabled cellular phone (not shown), and the like. Client electronic devices 32, 34, 36 may each be coupled to network 24 and/or network 26 and may each execute an operating system, examples of which may include, but are not limited to, Microsoft Windows, Microsoft Windows CE, Redhat Linux, or a custom operating system.

The instruction sets and subroutines of client-side continuity processes 14, 16, 18, which may be stored on storage devices 38, 40, 42 (respectively), may be executed by one or more processors (not shown) and one or more memory architectures (not shown) incorporated into client electronic devices 32, 34, 36 (respectively). Storage devices 38, 40, 42 may include but are not limited to: hard disk drives; tape drives; optical drives; RAID arrays; random access memories (RAM); read-only memories (ROM), compact flash (CF) storage devices, secure digital (SD) storage devices, and memory stick storage devices.

In addition to server-side continuity processes 10, 12, server computers 20, 22 may each execute a communication server application (e.g., first communication server application 44, and second communication server application 46), examples of which may include, but are not limited to, an email server application (e.g., IBM® Lotus® Domino® Server and Microsoft Exchange® Server), an instant messaging server application (e.g., Lotus Sametime®, Microsoft Office Live Communications Server, Jabber XCP®, and AOL® Instant Messenger™), a paging server application (e.g., Air Messenger LAN Server, by Internet Software Solutions), and short messaging service server application (e.g., Microsoft ISA Server), or the like. First communication server application 44 and/or second communication server application 46 may allow users 48, 50, 52 to communicate with one another (e.g., exchange email messages, instant message, text messages, and the like) via communication client applications (e.g., first communication client applications 54, 56, 58 and second communication client applications 60, 62, 64), examples of which may include, but are not limited to, email client applications (e.g., Lotus Notes and Microsoft Outlook), instant messaging applications (e.g., AOL Instant Messenger, IBM Lotus Sametime, Google® Talk), or the like.

If the continuity process is configured as a server-side continuity process, server side continuity processes 10, 12 may be a stand alone application that interface with one or more communication server applications (e.g., with first communication server application 44 and/or second communication server application 46) or may be an applet/application that is executed within one or more communication server applications. Additionally, while first communication server application 44 and second communication server application 46 are shown residing on separate server computers 20, 22, the first and second communication server application may reside on, and be executed by, a single server computer. In that case, a single server-side continuity process may reside on the single server computer and may interface with one or more of the first and the second communication server applications. Further, in the case in which the first and the second communication server application reside on a single server computer, a server-side continuity process may be an applet/application that is executed within one or more of the first and the second communication server applications.

If the continuity process is configured as a client-side continuity process, client-side continuity processes 14, 16, 18 may be stand alone applications that interface with one or more of first communication client applications 54, 56, 58 and second communication client applications 60, 62, 64. Further, client-side continuity processes 14, 16, 18 may be applets/applications that are executed within one or more of first communication client applications 54, 56, 58 and second communication client applications 60, 62, 64.

The instruction sets and subroutines of first communication server application 44 and second communication server application 46, which may be stored on storage devices 28, 30 (respectively) coupled to server computers 20, 22 (respectively) may be executed by one or more processors (not shown) and one or more memory architectures (not shown) incorporated within server computers 20, 22.

The instruction sets and subroutines of first communication client applications 54, 56, 58 and second communication client application 60, 62, 64, which may be stored on storage devices 38, 40, 42 (respectively) coupled to client electronic devices 32, 34, 36 (respectively), may be executed by one or more processors (not shown) and one or more memory architectures (not shown) incorporated into client electronic devices 32, 34, 36 (respectively). Using first communication client applications 54, 56, 58 and/or second communication client applications 60, 62, 64, users 48, 50, 52 may access one or more of first communication server application 44 and second communication server application 46 (respectively) and may allow users 48, 50, 52 to communicate with one another, e.g., via email messages, instant messages, text messages, and the like.

Users 48, 50, 52 may access one or more of first communication server application 44 and second communication server application 46 directly through the device on which the communication client applications (e.g., first communication client applications 54, 56, 58 and second communication client application 60, 62, 64) is executed, namely client electronic devices 32, 34, 36, for example. Users 48, 50, 52 may access one or more of first communication server application 44 and second communication server application 46 directly through network 24 or through network 26. Further, server computers 20, 22 (i.e., the computers that execute first communication server application 44 and second communication server application 46) may be connected to network 24 through network 26, as illustrated with phantom link line 64.

The various client electronic devices may be directly or indirectly coupled to network 24 (or network 26). For example, personal computer 32 is shown directly coupled to network 24 via a hardwired network connection. Further, notebook computer 34 is shown wirelessly coupled to network 24 via wireless communication channel 66 established between notebook computer 34 and wireless access point (i.e., WAP) 68, which is shown directly coupled to network 24. WAP 68 may be, for example, an IEEE 802.11a, 802.11b, 802.11g, Wi-Fi, and/or Bluetooth device that is capable of establishing wireless communication channel 66 between notebook computer 34 and WAP 68. Personal digital assistant 36 is shown wirelessly coupled to network 24 via wireless communication channel 70 established between personal digital assistant 36 and cellular network/bridge 72, which is shown directly coupled to network 24.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client side continuity processes 14, 16 are going to be described for illustrative purposes. However, this is not intended to be a limitation of this disclosure, as other configurations may be equally utilized. Additionally, for the purpose of the following discussion, the first communication application (i.e., first communication server application 44 and first communication client applications 54, 56, 58) will be described as an instant messaging application, and the second communication application (i.e., second communication server application 46 and second communication client applications 60, 62, 64) will be described as an email application. However, this is also not intended to be a limitation of this disclosure, as the continuity process may be equally applicable to other combinations and variations of communication applications.

Figure 2:
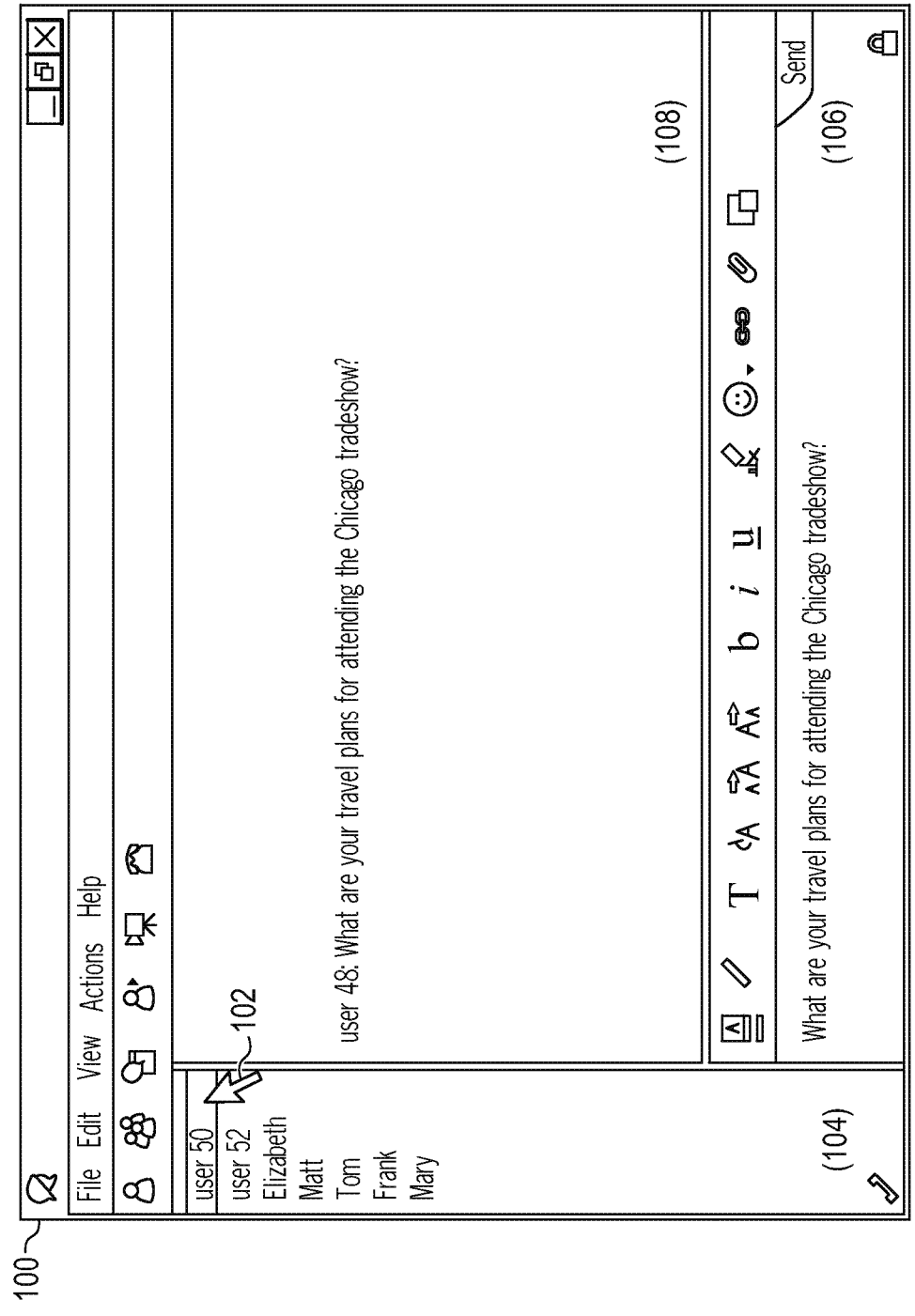
FIG. 2 is a diagrammatic view of a display screen rendered by the first communication application and/or the continuity process of FIG. 1.

Referring also to FIG. 2, first communication client application 54 (alone or in combination with continuity process 14) may allow a user (e.g., user 48) to conduct instant messaging chats with one or more recipients through instant messaging visual interface 100. When conducting an instant messaging chat, user 48 may define a desired recipient, e.g., by selecting, via onscreen pointer 102 (which may be controlled by a pointing device such as a mouse; not shown) a desired recipient (e.g., user 50) from buddy list 104, inputting an instant messaging user ID (not shown) or the like. Once user 48 has selected user 50 as the desired instant messaging chat recipient, first communication client application 54 may allow user 48 to type desired instant message content in typing pane 106. For example, user 48 may type the message content:

What are your travel plans for attending the Chicago tradeshow?

The message content input by user 48 may appear in chat pane 108, along with the name of the poster (i.e., user 48).

Figure 3:
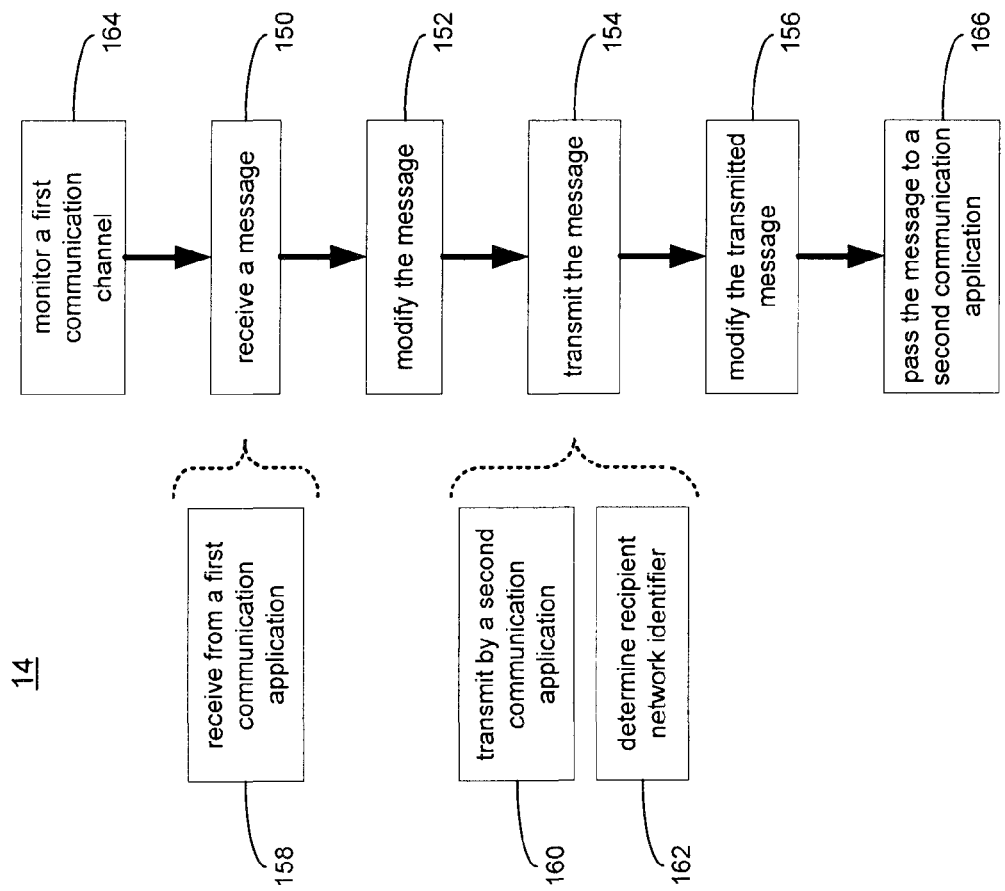
FIG. 3 is a flowchart of a process that may be performed by the continuity process of FIG. 1.

Continuity process 14 may allow the instant message (i.e., "What are your travel plans for attending the Chicago tradeshow?") to be sent to user 50 over a communication channel other than an instant messaging communication channel. Accordingly, and referring also to FIG. 3, continuity process 14 may receive 150, on client electronic device 32, a message in a first format configured to be communicated over a first communication channel. Continuity process 14 may modify 152, on client electronic device 32, the message in the first format to form a message in a second format configured to be communicated over a second communication channel. The message in the second format may be based upon, at least in part, the message in the first format. Further, continuity process 14 may transmit 154, from client electronic device 32, the message in the second format over the second communication channel.

Continuing with the above-stated example, continuity process 14 may receive 150 the instant message "What are your travel plans for attending the Chicago tradeshow?" created by user 48, e.g., by receiving 158 the instant message from first communication client application 44 (e.g., which may be an instant messaging application, configured to communicate instant messages). The instant message may be in an format configured to be transmitted between instant messaging client applications (e.g., between first communication client applications 54, 56 via first communication server application 44, which may be an instant messaging server application) utilizing appropriate instant messaging protocols (e.g., Session Initiation Protocol, "SIP", or the like). Continuity process 14 (alone or in combination with one or more of first communication client application 54 and/or second communication client application 60) may modify 152 the instant message to create an email including the message "What are your travel plans for attending the Chicago tradeshow?".

Figure 4:
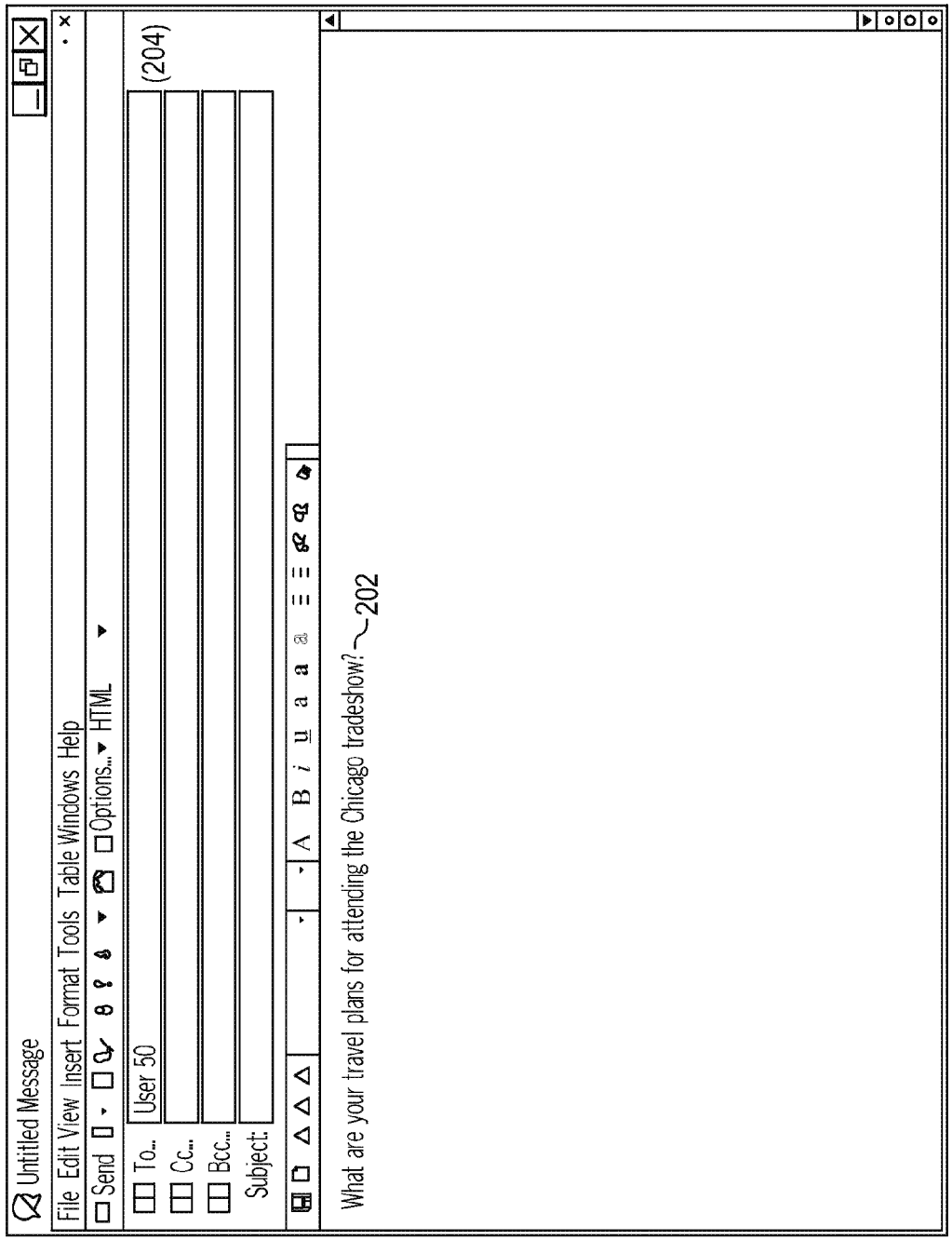
FIG. 4 diagrammatically depicts an email message generated by the continuity process and/or second communication application of FIG. 1.

For example, and referring also to FIG. 4, continuity process 14 (alone or in combination with one or more of first communication client application 54 and/or second communication client application 60, which may be an email client application) may generate email message 200. Email message 200 may be configured to be transmitted via an email communication channel (e.g., using Simple Mail Transfer Protocol, "SMTP", via second communication server application 46, which may be an email server application), and may include message content 202 (e.g. the body of the email message). Message content 202 may include the content of the instant message (i.e., "What are your travel plans for attending the Chicago tradeshow?") created via first communication client application 54. Additionally, email message 200 may include "TO" recipients field 204. Email message 200 may be addressed to user 50 (i.e., the intended recipient of the instant message "What are your travel plans for attending the Chicago tradeshow?") in "TO" recipients field 204.

Continuity process 14 (alone or in conjunction with one or more of first communication client application 54 and/or second communication client application 60) may transmit 154 email message 200 to user 50 via second communication server application 46. Email message 200 may be received by one or more of first communication client 56 and/or second communication client application 62 on laptop computer 34. Email message 200 may be transmitted 154 to user 50 via conventional email protocols (e.g., Simple Mail Transfer Protocol, "SMTP", for example). For example, transmitting 154 the message in the second format may include transmitting 160 the message in the second format by a second messaging application configured to transmit/receive messages in the second format. Accordingly, second communication client application 60 (e.g., which may be an email client application) may transmit 160 email message 200 to user 50. Additionally/alternatively, continuity process 14, may include an email client application and/or module that may transmit 154 email message 200 to user 50.

Transmitting 154 the message in the second format may include determining 162 a recipient network identification for messages in the second format, and transmitting 154 the message in the second format to the recipient network identification. For example, user 50's instant messaging identification may be different than user 50's email address. In order to transmit 154 email message 200 to user 50, continuity process 14 may determine 162 user 50's email network identification (i.e., user 50's email address). Continuity process 14 may determine 162 user 50's email address based upon, for example, information associated with user 50 via buddy list 104 of first communication client application 54 (e.g., which may include user 50's name, instant messaging identification, email address, telephone number, etc.). Additionally/alternatively, continuity process 14 may determine 162 user 50's email address via a look-up in a corporate directory (not shown), a contacts list associated with second communication client application 60 (e.g., which may be an email client application including a contacts list), or similar source.

Continuity process 16, executed on laptop computer 34, may modify 156 transmitted 154 email message 200 from the email format to an instant messaging format, e.g., to form an instant message including as message content "What are your travel plans for attending the Chicago tradeshow?". Email message 200 may include an indicator that the message is intended for delivery as an instant message (e.g., that the message originated as an instant message and was transmitted 154 via an email communication channel). For example, email message 200 may include embedded data indicating that the message is intended for delivery as an instant message. Various additional and/or alternative indicators may be used, including, but not limited to, text included in the subject line, message body, etc., indicating intended delivery as an instant message, for example.

Continuing with the above stated-example, continuity process 16 may monitor email received by second communication client application 62 for the presence of an indicator that the received email is intended for delivery via instant messaging. Based upon, at least in part, email mail message 200 including an indicator that email is intended to be delivered via instant messaging, continuity process 16 may modify 156 transmitted email message 200 to form an instant message based upon, at least in part, transmitted email message 200.

Figure 5:
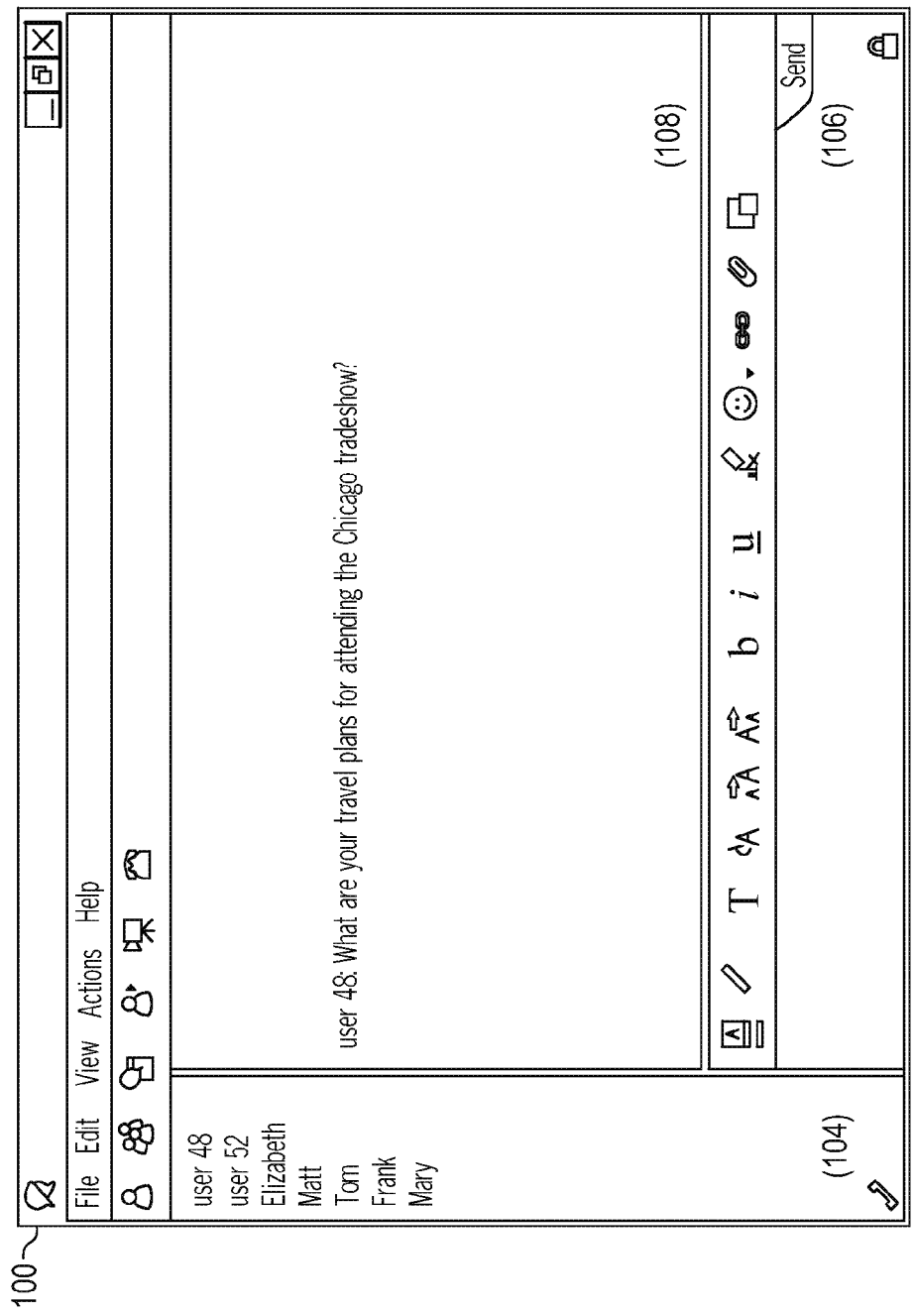
FIG. 5 is a diagrammatic view of a display screen rendered by the first communication application and/or the continuity process of FIG. 1.

The modified 156 message may be passed to a first messaging application configured to transmit/receive messages in the first format. Continuing with the above example and referring also to FIG. 5, continuity process 16 may pass 166 the modified 156 message (e.g., an instant message based upon, at least in part, email message 200) to first communication client application 56 (e.g., which may be an instant messaging client application). First communication client application 56 (alone or in conjunction with one or more of continuity process 16 and/or first communication server application 44) may render instant messaging visual interface 100. The modified 156 message (i.e., an instant message "What are your travel plans for attending the Chicago tradeshow?") may be displayed in chat pane 108. As such, the instant message generated by user 48 and transmitted via an email communication channel, may be delivered to user 50 for consumption as an instant message.

During an initial exchange of messages via the first communication channel one or more of continuity processes 14, 16 and/or first communication client applications 54, 56 may exchanges failover preferences. Continuing with the above-stated example, a first instant message sent by user 48 via first communication client application 54 may include a failover preference of email as the second communication channel. As such, in the event of a failure of the first communication channel (i.e., the instant messaging network) continuity processes 14, 16 and/or first communication client applications may have a pre-established failover channel. Further, one or more of continuity process 16 and/or first communication client application 56 may reply to the failover preference from continuity process 14 and/or first communication client application 54 acknowledging the failover preference and/or modifying the failover preference, e.g., in the event that continuity process 16 is not capable of complying with the failover preference.

Continuity process 14 may monitor, for client electronic device 32, the first communication channel to determine if a failure occurs in the first communication channel. For example, the second communication channel (e.g., an email communication channel) may be used for conveying the instant message in the case of a failure of the first communication channel (e.g., a failure associated with first communication server application 44, which may be an instant messaging server application, with server computer 20, on which first communication server application 44 is executed, and/or with infrastructure associated with the first communication channel). Continuity process 14 may monitor the instant messaging system to determine if a failure of the instant messaging system occurs. For example, an instant messaging client (e.g., first communication client application 54) may periodically (e.g., at intervals on the order of seconds) poll the instant messaging infrastructure. A failure of the instant messaging system may be indicated by, e.g., a lack of response to the periodic polling. The occurrence of a failure may be detected by continuity process 14. In response to a detected failure of the instant messaging system, continuity process 14 may utilize the email system (e.g., including second communication client applications 60, 62 and second communication server application 46) to send instant message between user 48 and user 50.

In the event of the failure of the first communication channel (e.g., instant messaging) the use of the second communication channel (e.g., email) as a failover may result in an increased burden on the second communication channel. The burden on the second communication channel may optionally be controlled by limiting the messages and/or users for which the second communication channel may serve as a failover. For example, the use of the second communication channel as a failover may be limited to messages marked as having one or more specified priority levels. For example, the second communication channel may only be used as a failover for messages marked as "high priority". Similarly, the use of the communication channel as a failover may be restricted to users above a specified position within an organization (e.g., department head or above). Further, a user interface may be included, wherein one or more users of the failed communication channel may choose to failover to the second communication channel and/or may choose to discontinue communications via the first communication channel (e.g., in favor of utilizing the second communication channel via a second communication application, or the like) Various other controls may be implemented, depending upon design criteria and user need.

While the foregoing discussion described in the context of an instant messaging first communication channel and an email second communication channel, such description is intended only for the purpose of illustration, and should not be construed as a limitation of this disclosure. The first and the second communication channels may include various different communication channels, systems, and protocols. For example, the first communication channel may be an email communication channel, and the message in the first format may include an email. Similarly, the second communication channel may be an instant messaging communication channel, and the message in the second format may include an instant message. Various other communication systems may similarly be employed consistent with the foregoing disclosure.

Additionally, while the foregoing discussion described a two-party communication (e.g., between user 48 and user 50) this is not intended as a limitation of this disclosure. For example, the failover mechanism described herein is equally application to multi-party communications, e.g., between three or more users.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product comprising:
a computer usable memory having computer usable program code embodied therewith, the computer usable program code comprising:
computer usable program code configured to receive a message from a client electronic device in a first format configured to be communicated over a first communication channel;
computer usable program code configured to modify the message in the first format to form a message in a second format configured to be communicated over a second communication channel, the message in the second format based upon at least in part, the message in the first format;
computer usable program code configured to transmit the message in the second format over the second communication channel; and
computer usable program code configured to monitor the first communication channel to determine if a failure occurs in the first communication channel, wherein modifying the message from the first to the second format is performed in response to detection of a failure in the first communication channel.

2. The computer program product of claim 1, further including computer usable program code configured to modify the message in the second format to form a transmitted message in the first format, the transmitted message in the first format based upon, at least in part, the message in the second format.

3. The computer program product of claim 1, wherein the computer usable program code configured to receive the message in the first format includes computer usable program code configured to receive the message in the first format from a first messaging application configured to transmit/receive messages in the first format.

4. The computer program product of claim 1, further including computer usable program code configured to pass the transmitted message to a first messaging application configured to transmit/receive messages in the first format.

5. The computer program product of claim 1, wherein the computer usable program code configured to transmit the message in the second format includes computer usable program code configured to transmit the message in the second format by a second messaging application configured to transmit/receive messages in the second format.

6. The computer program product of claim 1, wherein the computer usable program code configured to transmit the message in the second format includes computer usable program code configured to determine a recipient network identification for messages in the second format, and computer usable program code configured to transmit the message in the second format to the recipient network identification.

7. The computer program product of claim 1, wherein the message in the first format includes an instant message.

8. A computer program product comprising:
a computer usable storage medium for storing computer usable program code and having computer usable program code embodied therewith, the computer usable program code comprising:
computer usable program code configured to receive a message from a client electronic device in a first format configured to be communicated over a first communication channel;
computer usable program code configured to modify the message in the first format to form a message in a second format configured to be communicated over a second communication channel, the message in the second format based upon at least in part, the message in the first format;
computer usable program code configured to transmit the message in the second format over the second communication channel; and
computer usable program code configured to monitor the first communication channel to determine if a failure occurs in the first communication channel, wherein modifying the message from the first to the second format is performed in response to detection of a failure in the first communication channel.

9. The computer program product of claim 8, further including computer usable program code configured to modify the message in the second format to form a transmitted message in the first format, the transmitted message in the first format based upon, at least in part, the message in the second format.

10. The computer program product of claim 8, wherein the computer usable program code configured to receive the message in the first format includes computer usable program code configured to receive the message in the first format from a first messaging application configured to transmit/receive messages in the first format.

11. The computer program product of claim 8, further including computer usable program code configured to pass the transmitted message to a first messaging application configured to transmit/receive messages in the first format.

12. The computer program product of claim 8, wherein the computer usable program code configured to transmit the message in the second format includes computer usable program code configured to transmit the message in the second format by a second messaging application configured to transmit/receive messages in the second format.

13. The computer program product of claim 8, wherein the computer usable program code configured to transmit the message in the second format includes computer usable program code configured to determine a recipient network identification for messages in the second format, and computer usable program code configured to transmit the message in the second format to the recipient network identification.

14. The computer program product of claim 8, wherein the message in the first format includes an instant message.

15. A computer program product comprising:
a physical computer usable medium having computer usable program code embodied therewith, the computer usable program code comprising:
computer usable program code configured to receive a message from a client electronic device in a first format configured to be communicated over a first communication channel;
computer usable program code configured to modify the message in the first format to form a message in a second format configured to be communicated over a second communication channel, the message in the second format based upon at least in part, the message in the first format;
computer usable program code configured to transmit the message in the second format over the second communication channel; and
computer usable program code configured to monitor the first communication channel to determine if a failure occurs in the first communication channel, wherein modifying the message from the first to the second format is performed in response to detection of a failure in the first communication channel.

16. The computer program product of claim 15, further including computer usable program code configured to modify the message in the second format to form a transmitted message in the first format, the transmitted message in the first format based upon, at least in part, the message in the second format.

17. The computer program product of claim 15, wherein the computer usable program code configured to receive the message in the first format includes computer usable program code configured to receive the message in the first format from a first messaging application configured to transmit/receive messages in the first format.

18. The computer program product of claim 15, further including computer usable program code configured to pass the transmitted message to a first messaging application configured to transmit/receive messages in the first format.

19. The computer program product of claim 15, wherein the computer usable program code configured to transmit the message in the second format includes computer usable program code configured to transmit the message in the second format by a second messaging application configured to transmit/receive messages in the second format.

20. The computer program product of claim 15, wherein the computer usable program code configured to transmit the message in the second format includes computer usable program code configured to determine a recipient network identification for messages in the second format, and computer usable program code configured to transmit the message in the second format to the recipient network identification.

21. The computer program product of claim 15, wherein the message in the first format includes an instant message.

\* \* \* \* \*